US006681796B2

(12) United States Patent
King, Jr.

(10) Patent No.: US 6,681,796 B2
(45) Date of Patent: Jan. 27, 2004

(54) DRAINAGE VALVE PIPE TAP ASSEMBLY

(76) Inventor: Lloyd Herbert King, Jr., 394 Larimore Valley Dr., Wildwood, MO (US) 63005

( * ) Notice: Subject to any disclaimer, the term of this patent is extended or adjusted under 35 U.S.C. 154(b) by 0 days.

(21) Appl. No.: 10/005,258

(22) Filed: Dec. 3, 2001

(65) Prior Publication Data

US 2002/0040732 A1 Apr. 11, 2002

(51) Int. Cl.[7] ............................ B23P 15/52; E03B 7/08; F16L 55/07; F16K 15/14
(52) U.S. Cl. ................. 137/318; 137/15.14; 137/236.1; 137/512.4; 137/516.27; 137/528; 137/535; 137/550; 137/843; 137/107; 30/93; 210/429; 210/432; 222/80; 222/189.06; 222/494; 405/36; 405/37; 405/45; 408/102; 408/137
(58) Field of Search ................. 137/318, 107, 137/549, 550, 15.13, 15.14, 236.1, 512.4, 516.27, 528, 535, 843; 30/93; 408/102, 137, 138; 222/80, 494, 189.06; 251/145, 368; 210/429, 430, 431, 432; 405/36, 37, 39, 43, 44, 45; 239/542

(56) References Cited

U.S. PATENT DOCUMENTS

| 3,516,426 A | * | 6/1970 | Toll ............................ 137/318 |
| 3,905,718 A | * | 9/1975 | Luckenbill et al. ......... 137/318 |
| 3,976,091 A | * | 8/1976 | Hutton ........................ 137/318 |
| 4,540,011 A | * | 9/1985 | Croxford et al. ........... 137/318 |
| 4,574,443 A |   | 3/1986 | Persak et al. ............... 29/157.1 |
| 4,680,848 A | * | 7/1987 | Goldner ...................... 137/318 |
| 4,890,640 A | * | 1/1990 | King, Sr. ................... 137/512.4 |
| 5,076,318 A |   | 12/1991 | Fedora ....................... 137/318 |
| 5,080,527 A | * | 1/1992 | King, Sr. ...................... 405/36 |
| 5,105,844 A |   | 4/1992 | King, Sr. ...................... 137/15 |
| 5,241,981 A |   | 9/1993 | Ahern ........................ 137/318 |
| 5,345,964 A |   | 9/1994 | Friedel ....................... 137/318 |
| 5,425,395 A |   | 6/1995 | Brennan ..................... 137/318 |
| 5,577,529 A |   | 11/1996 | Katz .......................... 137/318 |
| 5,694,972 A |   | 12/1997 | King .......................... 137/318 |
| 5,732,732 A |   | 3/1998 | Gross et al. ................ 137/318 |
| 5,896,885 A |   | 4/1999 | Svetlik ........................ 137/15 |
| 5,964,240 A |   | 10/1999 | Granovski .................... 137/15 |
| 5,967,168 A |   | 10/1999 | Kitani et al. ................. 137/15 |
| 6,012,475 A |   | 1/2000 | Taylor et al. ................. 137/15 |
| 6,216,723 B1 |  | 4/2001 | King .......................... 137/318 |

* cited by examiner

*Primary Examiner*—George L. Walton
(74) *Attorney, Agent, or Firm*—Jacobson & Johnson

(57) ABSTRACT

A drainage valve tap assembly for connection of a branch line to a main line while simultaneously forming a freeze proof drain comprising a hollow body having a first end and a second end, a cutting tube attached to the first end of the body; a handle having a hollow interior, the handle attached to the second end of the body for rotating the body; and a resilient drain plug extending at least partially in the body for blocking off the flow of water therethrough under a water pressure and for allowing the draining of water therethrough and out of the drainage valve when the water pressure is cut-off.

25 Claims, 5 Drawing Sheets

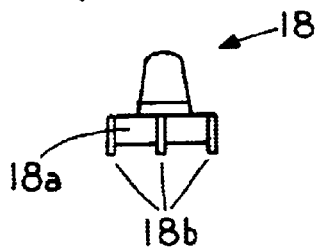
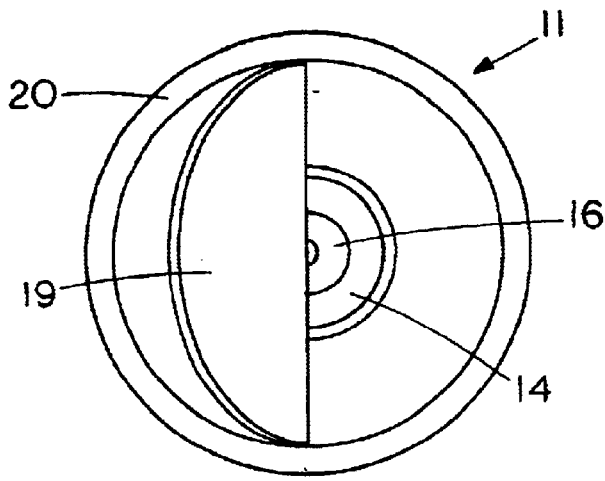
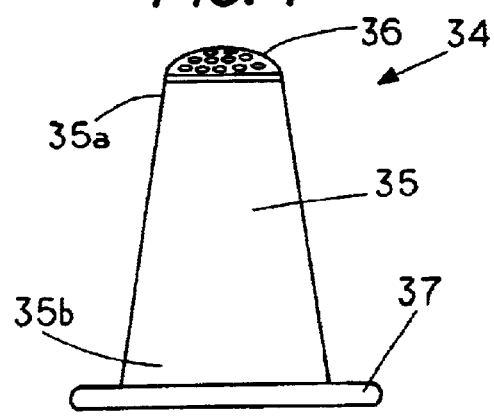
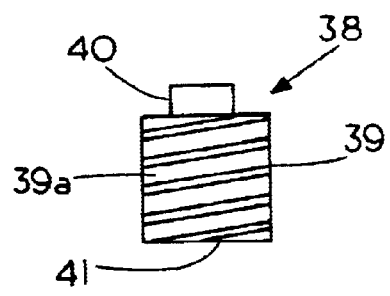
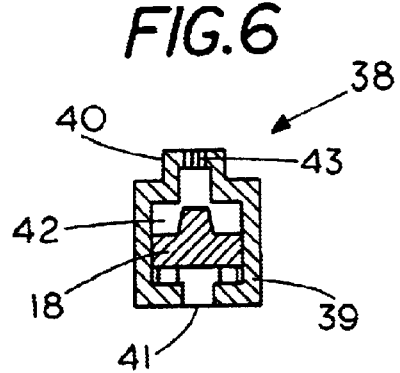

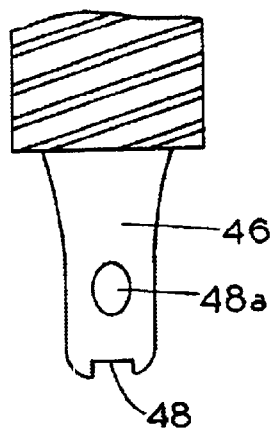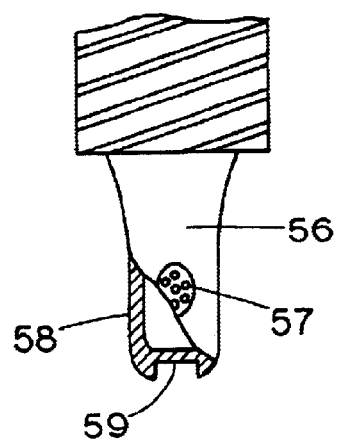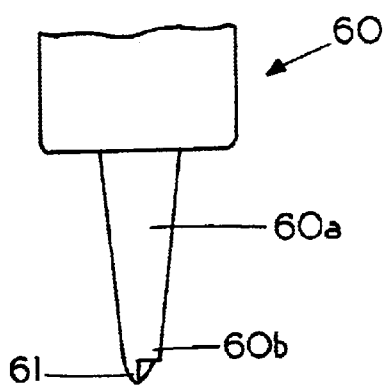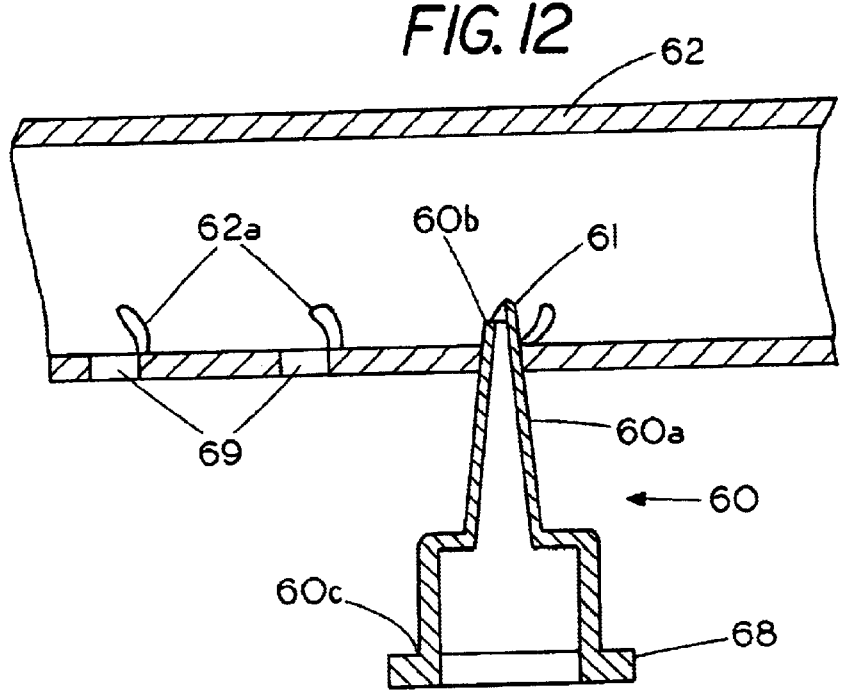

DRAINAGE VALVE PIPE TAP ASSEMBLY

CROSS-REFERENCE TO RELATED APPLICATIONS, IF ANY

This application is a continuation-in-part of U.S. patent application Ser. No. 60/183,612, filed Feb. 18, 2000.

STATEMENT REGARDING FEDERALLY SPONSORED RESEARCH OR DEVELOPMENT

Not applicable.

REFERENCE TO A MICROFICHE APPENDIX, IF ANY

Not applicable.

FIELD OF THE INVENTION

This invention relates generally to branch forming attachments and, more specifically, to a drainage valve pipe tap assembly for connection of a branch line to a main line without the aid of tools.

BACKGROUND OF THE INVENTION

The concept of forming branch attachments to rigid and plastic tubing is known in the art. Generally, pipe saddles are fastened around a pipe so that one can connect a branch tubing to a main tubing. Attaching a branch tubing to a main tubing often requires numerous steps and sometimes it is difficult to adequately seal the junction between the branch tubing and the main tubing.

The attaching device usually comprises two parts, a tap for forming the opening in the pipe and a saddle for holding the main tubing and the branch tubing in fluid communication. In one application shown in U.S. Pat. No. 5,105,844 a cutting tube, having an internal passage, both cuts a hole and forms a side attachment for the pipe. In the tap shown in U.S. Pat. No. 5,105,844 a coupon or plug is cut free of the pipe and is frictionally retained within the cutting tube so as not to interfere with or block the passageway in the pipe.

In the invention shown in U.S. Pat. No. 5,105,844 the pipe clamp or saddle comprises two identical parts that when snapped together form a threaded recess to allow a user to threadingly drive the pipe tap through the plastic pipe and position a branch pipe in fluid communication with the main tubing.

The self taping branch attachments are particularly well suited for underground irrigation systems that require in situ forming of branch lines to a main tubing, but they are also useful in other systems and other locations that use rigid, resilient or flexible tubing.

Other branching concepts pierce of the main pipe with a pointed tube. One example of such type of a tube is shown in U.S. Pat. No. 3,891,150 that shows an irrigation system that uses a probe with a tapered point that is forced though the sidewall of the main pipe. Another embodiment using a tapered point is shown in U.S. Pat. No. 5,694,972, which shows a saddle tee for an irrigation line and a stem with a tapered point that is punched through the plastic pipe. In the piercing method the tubing can be severely distorted in the region at the junction of the two pipes, which can cause leakage.

The pipe clamp used in U.S. Pat. No. 5,694,972 patent is also shown in U.S. Pat. No. 4,291,855 and comprises two segments that are hinged at an intermediate point to allow the segments to spread apart and receive a pipe.

The concept of drainage valves used in underground watering systems is also known in the art. U.S. Pat. No. 3,779,276 discloses a drainage valve for an underground watering system. The drainage valve includes a resilient valve member that prevents water from escaping from the underground water system under high water pressure but allows water to escape therethrough when water pressure is cut-off. U.S. Pat. No. 4,890,640 discloses a drainage valve having a non-extendable sealing member having a section that is restrained from blowout under pressure by a support surface.

The purpose of the drainage valve is to allow water to flow out of the underground pipes when the sprinkling system is shut off thereby preventing the pipes from bursting when the temperature drops below the water freezing point. This is accomplished by a resilient drain plug having a set of resilient legs, which is positioned within the interior of the drainage valve. When water is turned on, water pressure acts against the resilient drain plug causing the legs of the drainage valve to flex to provide for a fluid tight seal of the interior valve passageway to thereby block off the flow of water through the drainage valve. When water pressure is cut-off, the legs of the resilient drain plug return to their unflexed condition to thereby break the fluid tight seal and allow water stilling remaining within the drainage valve and the water pipes to escape through the drainage valve.

Generally, to install these drainage valves to a main pipeline, a user must first form a hole in the sidewall of the main pipelines by the use of a separate hole-forming tool such as a punching or cutting device. Next, the user attaches a branch line to the main line. The drainage valve is then secured to the branch line. This is often costly since the user has to purchase the separate hole-forming devices and branching attachments. It is also time consuming since the user has to perform two separate steps as well as carry these devices around from jobsite to jobsite.

The present invention is a drainage valve tap assembly that permits a worker in the field to attach a drainage valve to a pipeline while at the same time forming a branch line on the main tubing.

BRIEF SUMMARY OF THE INVENTION

Briefly, the present invention is a drainage valve tap assembly comprising a hollow tap body having a first end and a second end. Attached to the first end of the hollow tap body is a branch-forming member. Attached to the second end of the hollow tap is a handle having a hollow interior. Secured to the hollow tap body is a drainage valve. In one embodiment the drainage valve is integral with the tap to permit the simultaneous attachment of the drainage valve to a main pipeline and the formation of a branch-line.

DESCRIPTION OF THE PRIOR ART

U.S. Pat. No. 1,181,131 is a U-bolt pipe saddle with an extra piece required between the main and branch tubing to secure the fit;

U.S. Pat. No. 3,162,211 shows a device with a cutting needle for forming a hole in a pipe;

U.S. Pat. No. 3,240,434 shows an irrigation nozzle with a hollow point that is inserted through an opening in the pipe;

U.S. Pat. No. 3,343,724 shows a similar tap a tap with a needlepoint and a side port for tapping into the side of a sealed plastic bag;

U.S. Pat. No. 3,349,792 shows a tapping tee and valve;

U.S. Pat. No. 3,448,758 shows a refrigerator service valve that uses a hollow point that is cut at an angle to insert through a pipe;

U.S. Pat. No. 3,460,715 shows a tap with a needlepoint and a side port for tapping into the side of a sealed plastic bag;

U.S. Pat. No. 3,471,176 is a pipe saddle, which does not specify a method for creating the hole for the branch tubing;

U.S. Pat. No. 3,891,150 is a pipe saddle not suited for high-pressure or high-wear situations;

U.S. Pat. No. 3,920,937 shows a drip irrigation system, which includes a saddle and sharp pointed tube for extending through a pipe;

U.S. Pat. No. 3,973,732 shows a quick fitting that is forced through the wall of the tubing;

U.S. Pat. No. 4,239,265 is a pipe saddle requiring four steps and four different parts as well as a sealing ring;

U.S. Pat. No. 4,291,855 shows a pipe clamp having hinged portions for securing around a pipe;

U.S. Pat. No. 4,789,189 is a metal pipe saddle requiring a cutting tool to make a branch hole, and another device to reseal the hole;

U.S. Pat. No. 5,105,844 shows a two-step branch forming attachment with a cutter for cutting a coupon from a main pipe;

U.S. Pat. No. 5,169,177 shows a saddle for mounting around a tube;

U.S. Pat. No. 4,890,640 shows a drainage valve for use in pressure systems; and

U.S. Pat. No. 5,080,527 shows a drainage valve modifiable for use under different water pressures.

BRIEF DESCRIPTION OF THE DRAWINGS

FIG. 2 is a side view of an annular cone-shaped resilient drain plug;

FIG. 3 is a top view of a drainage valve showing drainage valve handgrip supporting a drain pad;

FIG. 4 is a side view showing an alternative embodiment of a drainage valve;

FIG. 5 is a side view showing another alternative embodiment of a drainage valve;

FIG. 6 is a cross-sectional view of the drainage valve of FIG. 5;

FIG. 9 is a close-up view of the cutting tube of FIG. 8 having a first inlet and a second inlet;

FIG. 10 is a close-up view showing an alternative embodiment of a cutting tube having a lateral inlet comprising a screen;

FIG. 11 is a close-up view of a tool comprising a shaft having a tapered body used for forming holes in a plastic pipe;

FIG. 12 shows a shaft in the process of forming a plurality of holes in a plastic pipe.

DESCRIPTION OF THE PREFERRED EMBODIMENT

Figure 1:
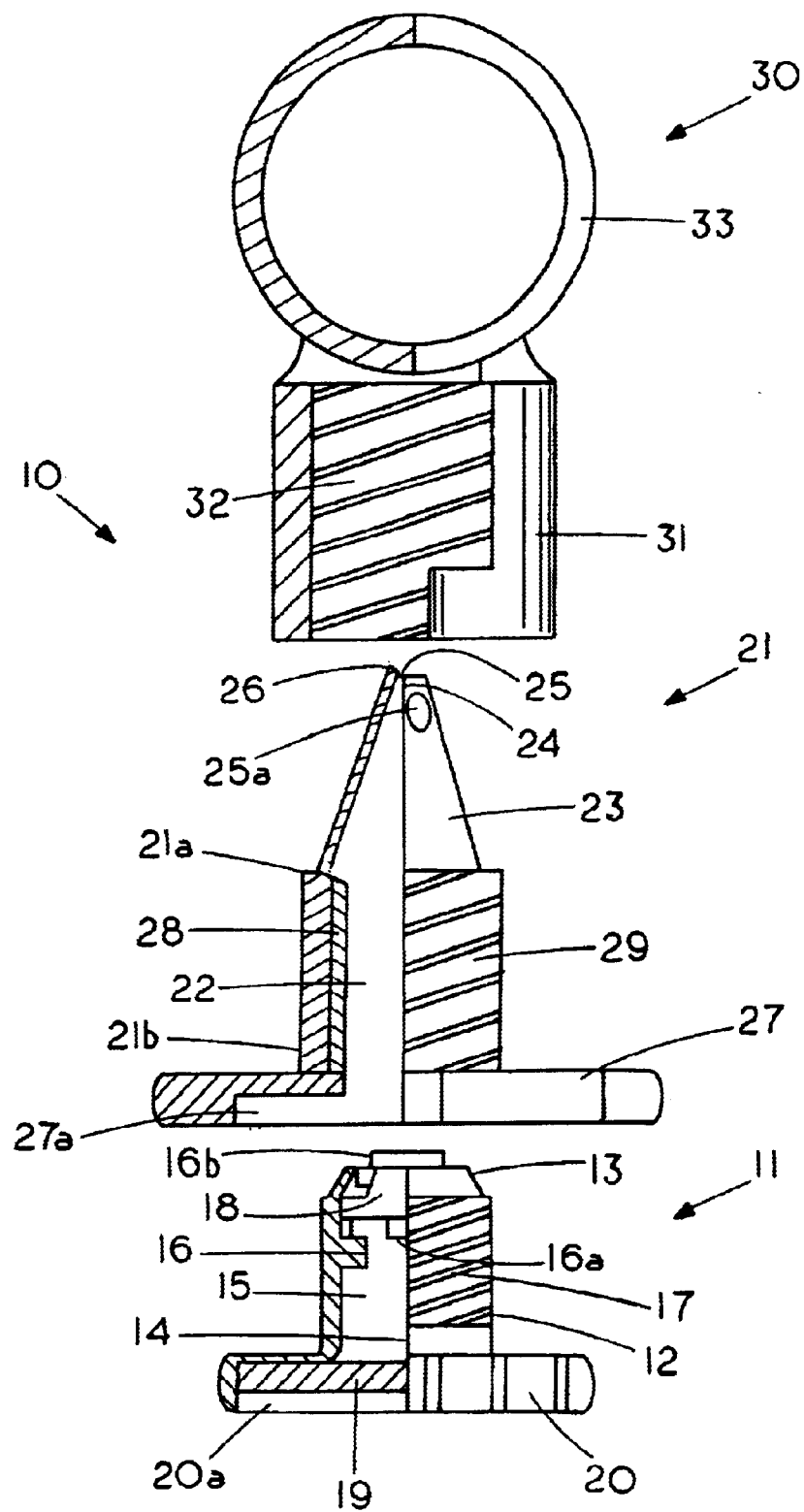
FIG. 1 is a partial cross-sectional exploded view showing drainage valve and pipe tap assembly of the present invention.

FIG. 1 is a partial cross-sectional exploded view showing drainage valve and pipe tap assembly 10 of the present invention. FIG. 1 shows drainage valve and pipe tap assembly 10 for a one-step connection of a branch line to a main line. The three components include a drainage valve 11, a branch forming member or pipe tap 21 and a saddle tee 30. Preferably, all three components are made out of a polymer plastic or the like.

Drainage valve 11 comprises a valve body 12 having a first end 13 and a second end 14. Located in the interior of valve body 12 is a passageway 15 allowing for the flow of water from the first end 13 of valve body 12 to the second end 14 of valve body 12. Located between first end 13 second end 14 is a drain plug support 16 having an opening 16a to allow water to flow therethrough. Located proximate first end 13 is a screen 16b having multiple openings that are sufficiently small to prevent the flow of dirt and other contaminants from flowing therethrough but sufficiently large to permit the flow of water therethrough. Located between drain plug support 16 and screen 16b is an annular coneshaped resilient drain plug 18. Located on the exterior of drainage valve body 12 is a male thread 17 for rotational engagement.

In FIG. 1, a drainage valve handgrip 20 is shown integral to the second end 14 of the body 12. Drainage valve handgrip 20 enables a user to grasp and rotate drainage valve body 12. Drainage valve handgrip 20 has a hollow interior 20a for support of a porous drain pad 19. Drain pad 19 prevents foreign particles from entering the passageway 15 of drainage body 12 while allowing for the drainage of water therethrough. Drainage pad 19 may be made from material such as Dacron or the like. This type of drainage valve is more thoroughly described in U.S. Pat. No. 4,890,640 and U.S. Pat. No. 5,080,527 and is hereby incorporated by reference.

It is the intent of this invention for drainage valve 11 to be attachable directly to a pipe tap so that the drainage valve can be secured to the main line at the same time the tap forms the branch line. The pipe tap 21 of this invention is a device that is capable of forming a hole in a sidewall of a pipe, while leaving a coupon integrally hinged but securely attached to the pipe wall, for creating a branch line.

Pipe tap 21 is shown in the present embodiment as having a first end 21a and a second end 21b. Located in the interior of pipe tap 21 is a chamber 22 connecting the first end 21a of the pipe tap 21 to the second end 21b of the pipe tap 21. Securely attached to first end 21a of pipe tap 21 is a cutting tube 23 having a tapered end 24. Located proximate tapered end 24 of cutting tube 23 is at least one cutting tooth 26 for cutting a hole in the sidewall of a pipe. In the embodiment of FIG. 1, also located proximate tapered end 24 of cutting tube 23 is a first water inlet 25 and a second water inlet 25a for receiving water therethrough. Located at the second end 21b of pipe tap 21 is a pipe tap handle 27 enabling a user to grasp and rotate pipe tap 21. Located on an interior wall of pipe tap 21 is a female thread 28 for rotationally engaging the male thread 17 of drainage valve 11. Located on the exterior of pipe tap 21 is a male thread 29 for rotational engagement with saddle tee 30.

Saddle tee 30 comprises a pipe tap receptor 31 having a hollow interior for receiving pipe tap 21 and a pipe receptor 33 for engaging and securing pipe tap receptor 31 to a pipe wall. Pipe tap receptor 31 includes a female thread 32 located on the interior wall of the receptor 31 allowing for the secure engagement with male thread 17 of pipe tap 21. Pipe tap 21 and saddle tee 30 are further described in U.S. patent application Ser. No. 60/183,612.

In one method of forming a connection of a branch line to a main line, the drainage valve is secured to the tap prior to forming the branch line. In this method pipe receptor 33 of saddle tee 30 first engages a pipe, securing pipe tap receptor 31 to the pipe. Pipe tap 21 with its male thread 29 then engages the female thread 32 of pipe tap receptor 31. The engagement between male thread 29 and the female thread 32 provides for a secure engagement between pipe tap 21 and pipe tap receptor 31. Pipe tap 21 then is rotated into pipe tap receptor 31 by the rotation of pipe tap handle 27. The rotation of pipe tap 21 into pipe tap receptor 31 rotationally drives cutting tube 23 through the sidewall of the pipe to form a partial hole in the pipe wall by the cutting action of cutting tooth 26 while leaving a coupon 54a (shown in FIG. 8) integrally hinged but securely attached to the pipe wall to maintain the coupon 54a in an out-of-the-way condition within the passageway of the pipe. The interaction between the cutting tube 23 and the pipe sidewall are further described in U.S. patent application Ser. No. 60/183,612.

In another method the drainage valves is secured to pipe tap after the pipe tap has been secured to the main line. Once pipe tap 21 is secured to saddle tee 30, drainage valve 11 is inserted into the pipe tap 21 until its male thread 17, engages the female thread 28 of the interior of wall of pipe tap 21 at the second end 21b of pipe tap 21. Drainage valve body 12 is then rotated into pipe tap 21 to thereby completing formation of a freeze proof irrigation system. The rotational engagement between the male thread 17 of the valve body 12 and the female thread 28 of the pipe tap 21 provides for a secure engagement between pipe tap 21 and drainage valve 11.

In the preferred method of forming a connection of a branch line to a main line for the present invention would be to attach drainage valve 11 to pipe tap 21 before pipe tap 21 engages saddle tee 30 and is rotationally driven through a sidewall of a pipe to form a hole in the pipe wall while leaving a coupon 54a (shown in FIG. 8) integrally hinged but securely attached to the side wall. In this method one completes the installation of the drainage valve into the system at the same time the tap forms a branch attachment to the main line.

In the embodiment shown in FIG. 1, water from a pipeline first enters first water inlet 25 and second water inlet 25a of pipe tap 21. Water then flows through chamber 22 of pipe tap 21 and arrives at screen 16b. At screen 16b, the multiple openings of screen 16b allow for the continual movement of the water to pass through screen 16b but prevent sand, dirt particles, and other contaminates from passing therethrough. While screen 16b is shown in drainage valve 10, such screen is not necessary as the screen on water inlet 25a prevents sand, dirt, and other particles from passing through the drainage valve.

After water passes through screen 16b it is immediately met by resilient drain plug 18. Resilient drain plug 18 is made of a resilient material such as rubber or the like. Resilient drain plug 18, shown in FIG. 2, comprises a base 18a and a set of legs 18b. When water is turned on and enters drain valve 11, water pressure acts on resilient drain plug 18 by pushing resilient drain plug 18 against drain plug support 16, causing the set of resilient legs 18b to flex into base 18a to provide for a fluid tight seal of opening 16a and thereby blocking off the flow of water through passageway 15. When water pressure is cut-off, the fluid tight seal of opening 16b is broken by resilient legs 18b returning to their unflexed condition to thereby allow any water still remaining in the piping and drainage valve 11 to pass under resilient drain plug 18 and through opening 16a.

Water then continues through passageway 15 before escaping through drain pad 19. Allowing water to escape from drainage valve 11 prevents water in the pipes and assembly 10 from freezing and expanding, causing possible damages to the pipes and drainage valve and pipe tap assembly 10 in regions where temperatures often drop below the water freezing point. The draining operation is further described in U.S. Pat. No. 4,890,640 and U.S. Pat. No. 5,080,527, which are incorporated by reference.

FIG. 3 is a top view of drainage valve 11 showing drainage valve handgrip 20 with drain pad 19 located therein and partially bent to reveal the interior of drainage valve 11 and drain plug support 16.

FIG. 4 is a side view showing an alternative embodiment of an insert 34 for a pipe tap. Insert 34 comprises a hollow body 35 having a first end 35a and a second end 35b. Although the body 35 is shown in FIG. 4 to be tapered, alternative embodiments of drainage valve body 35 may be non-tapered. Located proximate first end 35a of body 35 is a screen 36 having multiple openings that are sufficiently small to prevent the flow of dirt and other contaminants but sufficiently large permit the flow of water through the screen. Screen 36 is made of a polymer plastic and is form by either being molded with drainage valve 34 or is secured to first end 35a of body 35 through such methods as heat sealing or adhesive bonding.

Located proximate the second end 35b of body 35 is a body support 37. Body support 37 supports insert 34 within a pipe tap and are engageable to the female thread 28 of a pipe tap such as pipe tap 21, shown in FIG. 1. One of the benefits of the present embodiment is that since there is no male thread along the body 35, the present embodiment allows insert 34 to be quickly attached to the pipe tap while still being capable of screening off various particles. Once installed a resilient drain plug, such as shown in FIG. 2, can be mounted on a support surface therein to provide the necessary freeze protection for the system.

FIG. 5 is a side view and FIG. 6 is a cross-sectional view showing yet another alternative embodiment of a drainage valve 38 insert for a pipe tap. As shown, drainage valve 38 includes a hollow body 39 having an inlet 40 and an outlet 41. Located proximate inlet 40 is a screen 43 having multiple openings that are sufficiently small to prevent the flow of dirt and other contaminants but sufficiently large to permit the automatic flow of water through the screen. Located on the exterior of hollow body 39 is a male thread 39a for rotationally engaging a female thread. Located within body 40 is a passageway 42 allowing for the passage of water from inlet 40 to outlet 41. A resilient drain plug 18 having a base 18a and a set of legs 18b is shown in FIG. 6 located within the passageway 42 of body 39. When water is turned on, water pressure acts against resilient drain plug 18 causing the set of legs 18b to flex into body 18a to provide for a fluid tight seal to thereby block off the flow of water through outlet 41. When water pressure is cut-off, legs 18b of resilient drain plug 18 return to their unflexed condition to thereby allow water stilling remaining within the piping and drainage valve 38 to escape by way of outlet 41. Allowing water to escape from the piping and drainage valve 38 prevents the piping from freezing and causing possible damages to the pipes.

Figure 7:
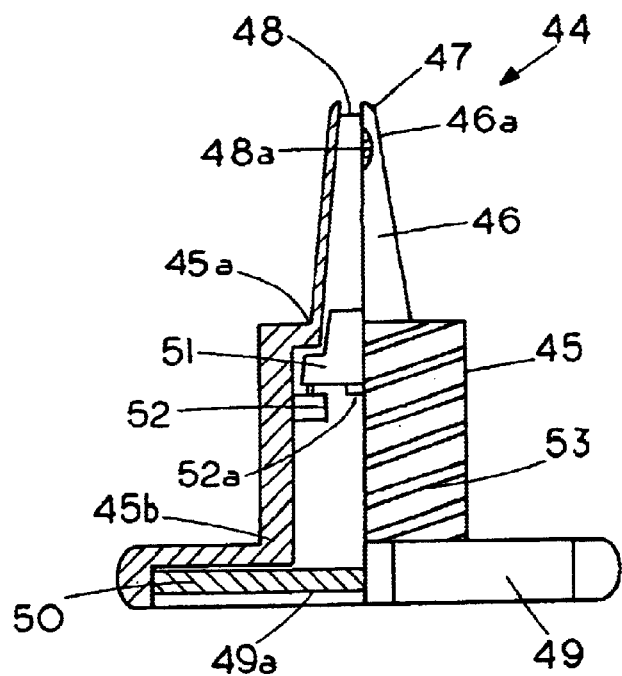
FIG. 7 is a partial cross-sectional view showing an alternative embodiment of a drainage valve and pipe tap assembly.

FIG. 7 is a partial cross-sectional view showing a preferred embodiment of a drainage valve and pipe tap assembly 44 where the drainage valve is integral to the pipe tap to allow one to simultaneously form a branch line and freeze proof the system. The embodiment of pipe tap 44 is similar in shape to the pipe tap 21 shown in FIG. 1. Drainage valve and pipe tap assembly 44 comprises a hollow body 45 having a first end 45a and a second end 45b. Attached to first end 45a of hollow body 45 is a cutting tube 46 having a tapered end 46a. Located proximate tapered end 46a is at least one tooth 47 for cutting a hole in the sidewall of a pipe while leaving a coupon 54a (shown in FIG. 8) integrally hinged but securely attached to the sidewall in an out-of-the-way condition. Located on the cutting tube are a first inlet 48 and a second inlet 48a for receiving water.

Located at the second end 45a of hollow body 45 is a handle 49 having a hollow interior 49a. Handle 49 is integral to hollow body 45 and is used for grasping and rotating hollow body 45. Located on the exterior of body 45 is a male thread 53 for rotational engagement.

In the embodiment of FIG. 7, hollow interior 49a is shown supporting a drain pad 50. Drain pad 50 prevents foreign particles from entering hollow interior 49a of hollow body 45 while allowing for the drainage of water therethrough.

Located within hollow body 45 is a drain plug support 52, having an opening 52a, for support resilient drain plug 51. Also located within hollow body 45 between first end 45a and drain plug support 52 is a resilient drain plug 51 for blocking off the flow of water through opening 52a under a water pressure and for allowing the draining of water therethrough when the water pressure is cut-off.

Figure 8:
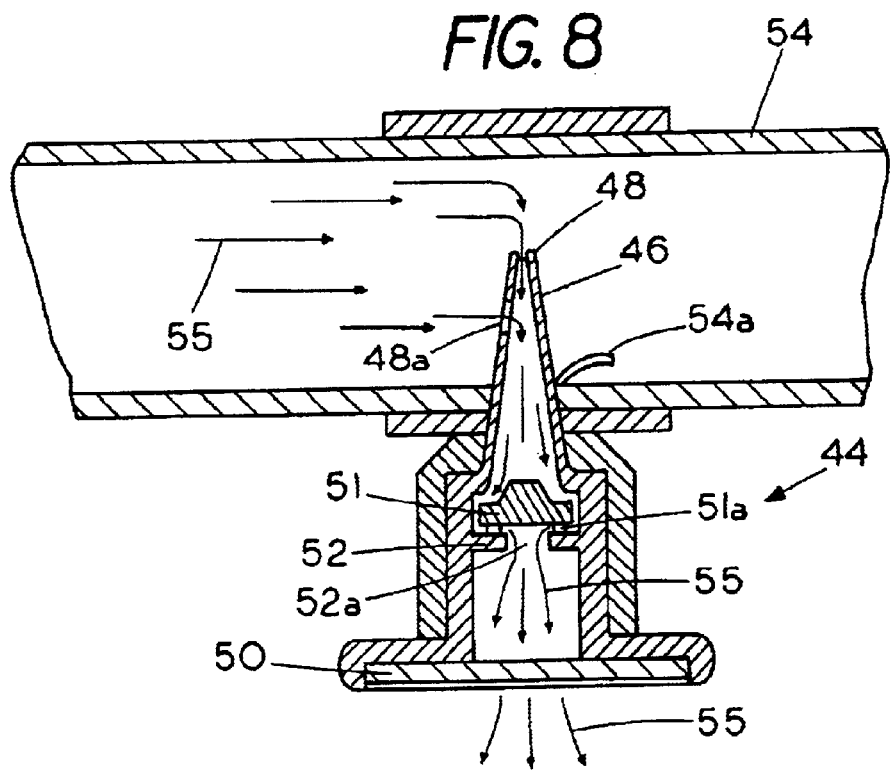
FIG. 8 is a cross-sectional view showing the operation of a drainage valve and pipe tap assembly.

FIG. 8 is a cross-sectional view showing the operation of drainage valve and pipe tap assembly 44. In the operation of drainage valve and pipe tap assembly 44, water, shown by arrows 55, from a pipeline 54 first enters first water inlet 48 and second water inlet 48a of cutting tube 46. Water then flows through cutting tube 46 after which it is met by resilient drain plug 51. The water pressure created by the flow of water into cutting tube 46 acts on resilient drain plug 51 to push resilient drain plug 51 against drain plug support 52. Under sufficiently high water pressure, the force that resilient drain plug 51 acts against drain plug support 52 causes resilient legs 51a to flex to thereby provide for a fluid tight seal of opening 52a to thereby blocking off the flow of water therethrough. When water pressure is cut-off, the fluid tight seal of opening 52a is broken by resilient legs 51a returning to their unflexed condition to thereby allow any water still remaining in the assembly 44 to pass under resilient drain plug 51 and out of assembly 44.

Allowing water to escape from assembly 44 prevents water in the pipes and assembly 44 from freezing and expanding, causing possible damages to the pipes and assembly 44 in regions where temperatures often drop below the water freezing point. The draining operation is further described in U.S. Pat. No. 4,890,640 and U.S. Pat. No. 5,080,527, which are incorporated by reference.

FIGS. 9 and 10 are close-up views showing alternative embodiments of a cutting tube with FIG. 10 also showing a partial cross-sectional view of the tapered end 58. The embodiment of cutting tube 46 in FIGS. 8 and 9 shows cutting tube 46 having first inlet 48 and second inlet 48a for receiving water therethrough. The embodiment of cutting tube 56 in FIG. 10 shows cutting tube 56 as having just one lateral inlet comprising a screen 57 for receiving water therethrough. Screen 57 has multiple openings that are sufficiently small to prevent the flow of dirt and other contaminants but sufficiently large permit the automatic flow of water through the screen. Screen 57 is made of a polymer plastic and can be formed by being molded with pipe cutting tube 56 or can be made and attached to cutting tube 56 through such methods as heat sealing or adhesive bonding. Although one screen is shown in the present embodiment, alternative embodiment may include more or less screens.

In the embodiment of the cutting tubes in FIGS. 7, 8 and 9, the cutting tubes are shown having a first inlet 25, 48 for receiving water therethrough. In the embodiment of FIG. 10, the region of cutting tube 56 comparable to the first inlet of FIGS. 1, 7, 8 and 9 or the tip 59 of the cutting tube 56 is closed off, resulting in the flow of water through the lateral inlet of cutting tube 46. By providing for the flow of through screen 57, dirt and other contaminants may be filtered by screen 57 to thereby further reduce the clogging of the valve and pipe tap assembly.

FIG. 11 is a close-up view of a tool, comprising a shaft 60 having a tapered body 60a, used for forming holes in a plastic pipe without leaving the tool therein. This tool is ideal for projects in which holes are required to be formed in a pipe for attachment to a separate assembly or in projects requiring the formation of a plurality of holes in a pipe such as, for example, in the formation of a drip irrigation system. Although FIG. 11 shows shaft 60 having one cutting tooth 61 extending outwardly from a first end 60b of shaft 60 for forming a hole in a pipe, alternative embodiments of shaft 60 may comprise numerous cutting teeth for forming a hole in the pipe.

FIG. 12 shows shaft 60 in the process of forming a plurality of holes 69 in a plastic pipe 62. Although the embodiment in FIG. 12 shows shaft 60 having a hollow body 60a, alternative embodiments of shaft 60 may have a hollow or a solid body. In addition, although shaft 60 is shown in FIG. 12 forming the plurality of holes 69 in the sidewall of pipe 62 without the use of a saddle tee, shaft 60 can also be used with a saddle tee to form the holes when so desired.

In the formation of the holes in pipe 62, cutting tooth 61 of shaft 60 first engages the sidewall of pipe 62, pipe 62 comprising a plastic material such as polyethylene, PVC, or the like. A user then uses his or her hands to apply axial force to shaft 60 while simultaneously rotationally driving shaft 60 into the sidewall of pipe 62. A user can rotationally drive shaft 60 into the sidewall of pipe 62 by rotating shaft 60 with the user's hands. The embodiment of FIG. 12 includes a shaft handle 68 integral to a second end 60c of shaft 60, handle 68 enabling a user to grasp tapered body 60a of shaft 60 for rotationally driving shaft 60 through the sidewall of pipe 62 to form a hole 63 in the sidewall of pipe 62. The axial force applied by the user against the sidewall of pipe 62 along with the simultaneous rotation of shaft 60 causes cutting tooth 61 to form hole 63 in the sidewall of pipe 62 while leaving a coupon 62a integrally hinged but securely attached to the sidewall of pipe 62 to maintain coupon 62a in an out-of-the-way condition within the passageway of the pipe. Once hole 63 has been formed in the sidewall of pipe 62, tapered body 60a of shaft 60 is driven further into hole 63 thereby spreading hole 63 further apart. An advantage of the present invention is that unlike other known hole forming tools which leaves excess materials in the pipe after the holes are formed, the present invention forces out the piping materials thereby leaving the pipe with just coupons 62a in an out-of-the-way condition after the holes are formed.

Figure 13:
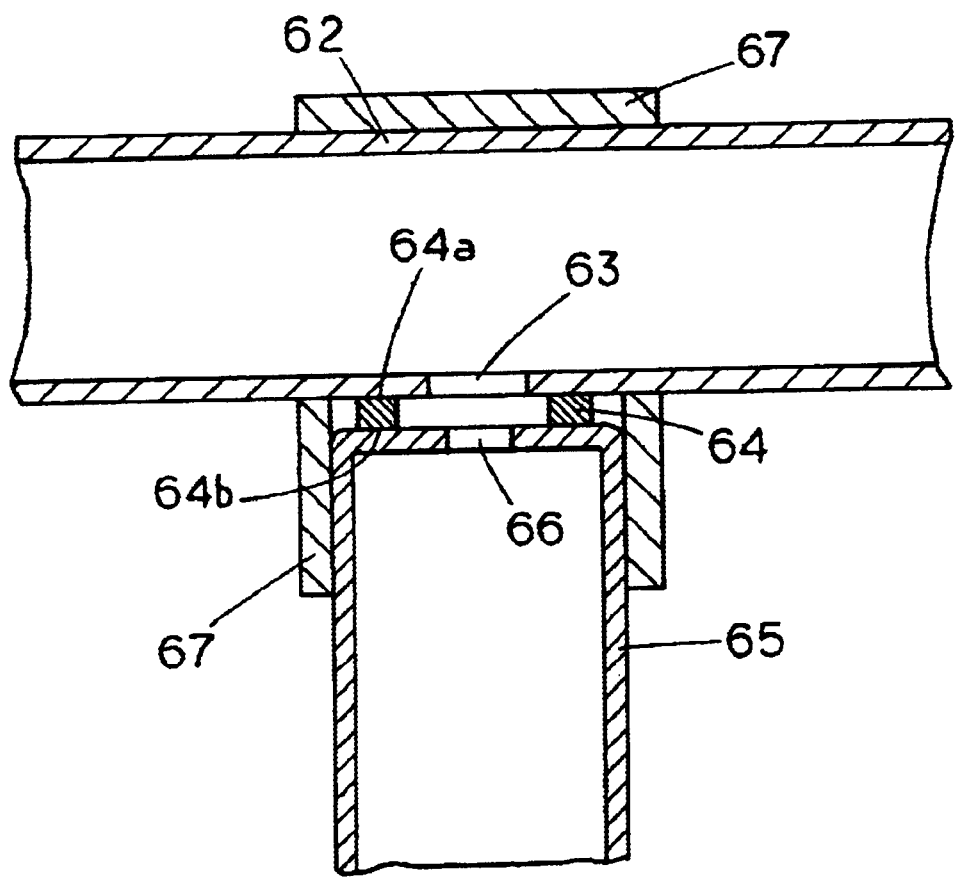
FIG. 13 shows the attachment of a branching tube to a pipe wall.

FIG. 13 shows pipe 62 with hole 63 formed in the sidewall of pipe 62 by shaft 60 of FIGS. 11 and 12. After hole 63 has been formed in pipe 62 an elastomer sealing ring such as an O-ring 64, having a first face 64a and a second face 64b, is then placed around hole 63 with the first face 64a of O-ring 64 engaging the sidewall of pipe 62, as shown in FIG. 13.

FIG. 13 also shows a branching tube 65 having a preformed hole 66 located in a wall surface of tube 65. Once first face 64a of O-ring 64 engages the sidewall of pipe 62 branching tube 65 is then attached to the second face 64b of O-ring 64 with preformed hole 66 of branching tube 65 in a water receiving alignment with hole 63 of pipe 62. A fastening device 67, such as a clamp, is then attached to the pipe and branching tube assembly to maintain the connection of the pipe and branching tube assembly. The attachment of the fastening device 67 results in O-ring 66 forming a leak proof connection between pipe 64 and branching tube 65. Although the present method can be use with various types of piping, the present method, with its use of O-ring 64, is well suited for use with PVC piping since PVC piping maintain their shape, allowing for the compression of O-ring 64 to thereby form a leak proof connection.

The present invention includes a method of forming a connection of a branch line to a main line comprising the steps of: (1) engaging a cutting tooth 61 of a tapered shaft 60 to a sidewall of a pipe 62; (2) applying axial force to the shaft 60 while simultaneously rotating a shaft handle 68 to rotationally drive the shaft 60 through the sidewall of the pipe 62 to form a hole 63 in the sidewall of the pipe 62 while leaving a coupon 62a integrally hinged but securely attached to the sidewall of pipe 62 to maintain the coupon 62a in an out-of-the-way condition within the passageway of the pipe; (3) removing the shaft 60 from the sidewall of the pipe 62; (4) placing a first face 64a of an O-ring 64 around the hole 63 of the pipe 62 formed by the shaft 60; (5) aligning a preformed hole 66 in a branching tube 65 to the hole 63 of the pipe 62 formed by the shaft 60; (6) attaching the branching tube 65 to a second face 64b of the O-ring 64 with the preformed hole 66 of the branching tube 65 in a water receiving alignment with hole 63 of pipe 62 formed by the shaft 60; and (7) attaching a fastening device 67 to the pipe 62 and the branching tube 65 to maintain a connection between the pipe 62 and the branching tube 65 by way of the O-ring 65 thereby forming a leak proof connection between the pipe 62 and the branching tube 65.

The present invention also includes a method of making a drainage valve and pipe tap assembly comprising the steps of: (1) forming a drainage valve 38 having body 39, an inlet 40, an outlet 41, a passageway 42, a male thread 39a located on an exterior of the drainage valve 40, and a screen 43 and resilient drain plug 18 located therein; (2) forming a pipe tap 21 having a first end 21a, a second end 21b, a chamber 22 connecting the first end 21a of pipe tap 21 to the second end 21b of the pipe tap 21, a female thread 28 located on an interior wall of the pipe tap 21, a handle 20 having a hollow interior 20a located at the second end 21b of pipe tap 21, and a cutting tube 23 located at the first end 21a of pipe tap 21 having a tapered end 24 with at least one cutting tooth 26; and (3) attaching the drainage valve 38 to the pipe tap 21 by inserting the inlet 40 of the drainage valve 39 into the second end 21b of the pipe tap 21 and rotationally engaging the male thread 39a of the drainage valve 39 with the female thread 28 of the pipe tap 21.

The method of making a drainage valve and pipe tap assembly also include the step of: (1) attaching the drainage valve 39 to the pipe tap 21 before cutting a hole in a pipe; (2) or attaching the drainage valve 39 to the pipe tap 21 after cutting a hole in the pipe; (3) inserting the drainage valve 39 completely within the pipe tap 21; and (4) covering the hollow interior of the pipe tap 21 with a drain pad 50 to prevent foreign particles from entering the drainage valve and pipe tap assembly.

In addition, the method of making a drainage valve and pipe tap assembly also include the step of attaching a handgrip 20 having a hollow interior 20a with a drain pad 19 placed over the hollow interior 20a of the handgrip 20 to prevent foreign particles from entering the drainage valve and pipe tap assembly 10.

The present invention also includes an insitu method of forming a freeze proof drain comprising the steps of: (1) attaching a housing or saddle 30 having pipe a receptor 33 to a pipe; (2) attaching a pipe tap 21 to the housing 30; (3) forming a hole in a sidewall of the pipe by rotationally driving a cutting tube 23 of the pipe tap 21 through a sidewall the pipe; and (4) inserting a drainage valve 11 having a resilient drain plug 18 located therein into a chamber 22 in pipe tap 21 to form a freeze proof drain.

The present invention also includes an insitu method of forming a freeze proof drain system comprising (1) attaching a tap housing 30 to a pipe; (2) extending a tap 21 through a sidewall of the pipe; and (3) inserting a drainage valve 11 into the tap 21 to form a freeze proof drain system.

The present invention includes the method of forming a freeze proof drain system at the same time the branch line is formed by having the drainage valve integral to or carried by the tap.

I claim:

1. A drainage valve tap assembly comprising:
   a hollow body having a first end and a second end;
   a cutting tube attached to the first end of the body;
   at least one cutting tooth located on the cutting tube distal to the hollow body for cutting the sidewall of a pipe;
   a water inlet located on the cutting tube for receiving water,
   a first screen located between the cutting tooth and the second end of the body, the screen having multiple openings sufficiently small to prevent the flow of dirt and other contaminants from flowing therethrough but sufficiently large to permit the flow of water therethrough;
   a handle having a hollow interior, the handle attached to the second end of the body for rotating the body; and
   a resilient drain plug extending at least partially in the body between said first screen and the second end for blocking off the flow of water under a water pressure through the body and against the drain plug and for allowing the draining of water through the body and out the second end when the water pressure is cut-off thereby allowing the drain plug to open.

2. The drainage valve tap assembly of claim 1 wherein the water inlet located on the cutting tube is a second screen, the second screen having multiple openings sufficiently small to prevent the flow of did and other contaminants from flowing therethrough but sufficiently large to permit the flow of water therethrough.

3. The drainage valve tap assembly of claim 2 including a hollow handle, the handle integral to the second end of the body, the handle enabling a user to grasp and rotate the body.

4. The drainage valve tap assembly of claim 3 including a drain pad covering the hollow interior of the handle, the drain pad preventing foreign particles from entering the hollow body while allowing water to escape front the outlet therethrough.

5. The drainage valve tap assembly of claim 4 including a male thread located on an exterior of the hollow body to permit rotational engagement with the hollow body.

6. The drainage valve tap assembly of claim 1 including a saddle tee comprising:
   a pipe tap receptor having a hollow interior;
   a female thread, the female thread located within an interior wall of the cutting tube receptor for engaging a male thread of the drainage valve body; and
   a pipe receptor for securing the saddle tee to a pipe.

7. A drainage valve and pipe tap assembly comprising:
a valve body; the valve body having a first end and a second end;
a passageway located in an interior of the valve body, the passageway directing the flow of water from the first end of the valve body to the second end of the valve body;
a screen located between the first end and the second end of the valve body, the screen having multiple openings sufficiently small to prevent the flow of dirt and other contaminants from flowing therethrough but sufficiently large to permit the flow of water therethrough;
a resilient drain plug located within the drainage valve body between said first screen and the second end for blocking off the flow of water under a water pressure through the body and against the drain plug and for allowing the draining of water through the body and out the second end when the water pressure is cut-off thereby allowing the drain plug to open;
a male thread, the male thread located on an exterior of the valve body for rotational engagement;
a pipe tap, the pipe tap having a first end and a second end, a chamber connecting the first end of the pipe tap to the second end of the pipe tap;
a female thread, the female thread located within an interior wall of the pipe tap for engaging the male thread of the valve body; and
a cutting tube having a tapered end, located proximate the tapered end is a water inlet for receiving water therethrough, the cutting tube securely attached to the first end of the pipe tap, the cutting tube having at least one tooth located proximate the tapered end for cutting the sidewall of a pipe.

8. The drainage valve and pipe tap assembly of claim 7 including a second screen located on the cutting tube, the second screen having multiple openings sufficiently small to prevent the flow of dirt and other contaminants from flowing therethrough but sufficiently large to permit the flow of water therethrough.

9. The drainage valve and pipe tap assembly of claim 8 wherein the tapered end is plugged.

10. The drainage valve and pipe tap assembly of claim 10 including a second male thread, the second male thread located on the exterior of the pipe tap for engaging a second female thread.

11. The drainage valve and pipe tap assembly of claim 7 including a housing for receiving and supporting the pipe tap to a pipe comprising:
a pipe tap receptor having a hollow interior;
a second female thread, the second female thread located within the interior of the pipe tap receptor for engaging the second male thread; and
a pipe receptor for securing the pipe tap receptor to a pipe.

12. The drainage valve and pipe tap assembly of claim 7 including a handgrip having a hollow interior, the handgrip extending from the second end of the valve body to enable a person to grasp and rotate the valve body.

13. The drainage valve and pipe tap assembly of claim 12 including a drain pad covering the hollow interior of the handgrip, the drain pad preventing foreign particles from entering the passageway while allowing water to escape therethrough.

14. The drainage valve and pipe tap assembly of claim 13 including a handle, the handle securely attached to the second end of the pipe tap, the handle enabling a user to grasp and rotate the pipe tap.

15. A method of assembling a drainage valve and pipe tap assembly comprising the steps of:
providing a drainage valve having an inlet, an outlet, a passageway, and a resilient drain plug located therein;
providing a pipe tap having a first end, a second end, a hollow interior, a handle having a hollow interior located at the second end of the pipe tap, a cutting tube located at the first end of the pipe tap;
placing a screen between the first end and the second end of the pipe tap; and
attaching the drainage valve to the pipe tap by inserting an end of the drainage valve into the second end of the pipe tap to thereby form a freeze proof drain thereby allowing the drainage valve to move between an open and closed position when the water pressure is relieved and applied against the drainage valve.

16. The method of claim 15 including attaching the drainage valve to the pipe tap before cutting a hole in a pipe.

17. The method of claim 15 including attaching the drainage valve to the pipe tap after cutting a hole in the pipe.

18. The method of claim 15 including inserting the drainage valve completely within the pipe tap.

19. The method of claim 18 including the step of covering the hollow interior of the pipe tap with a drain pad to prevent foreign particles from entering the drainage valve and pipe tap assembly.

20. The method of claim 18 wherein the drainage valve includes a handgrip having a hollow interior with a drain pad placed over the hollow interior of the handgrip to prevent foreign particles from entering the drainage valve and pipe tap assembly.

21. An in situ method of assembling a freeze proof drain comprising the steps of:
attaching a housing to a pipe;
attaching a pipe tap to the housing;
forming a hole in a sidewall of the pipe by rotationally driving a cutting tube of the pipe tap through the sidewall of the pipe;
placing the cutting tube so that a screen located on the cutting tube is positioned within an interior of the pipe; and
inserting a drainage valve having a resilient drain plug located therein into a chamber in the pipe tap to form a freeze proof drain thereby allowing the drainage valve to move between an oven and closed position when the water pressure is relieved and applied against the drainage valve.

22. An in situ method of assembling a freeze proof drain system comprising:
attaching a tap housing to a pipe;
extending a tap having a screen thereon through a sidewall of the pipe; and
inserting a drainage valve into the tap to form a freeze proof drain system thereby allowing the drainage valve to move between an open and closed position when the water pressure is applied against the drainage valve.

23. A tool for forming a hole in a plastic pipe consisting:
a hollow shaft having a first end and a second end, said shaft having a tapered body;
a cutting tooth located at the first end of the shaft for cutting a sidewall of a pipe;

a screen located between the first end and the second end of the shaft, said screen preventing a flow of dirt and other containment therethrough while simultaneously allowing for a flow of water therethrough; and a handle, said handle to the second end of the shaft, said handle enabling a user to grasp and rotate the shaft to form a hole in the sidewall of the pipe.

24. The tool of claim 23 wherein the shaft includes more than one cutting tooth located at the first end of the shaft for cutting the sidewall of the pipe.

25. The tool of claim 23 wherein the cutting tooth axially extends outwardly from the first end of the shaft.

* * * * *